March 5, 1957     R. C. GAUGER ET AL     2,784,361

SPEED SYNCHRONIZER

Filed Nov. 16, 1953     2 Sheets-Sheet 1

INVENTORS.
ROY C. GAUGER
EDWARD W. PERKINS
BY
James B. Christie
ATTORNEY

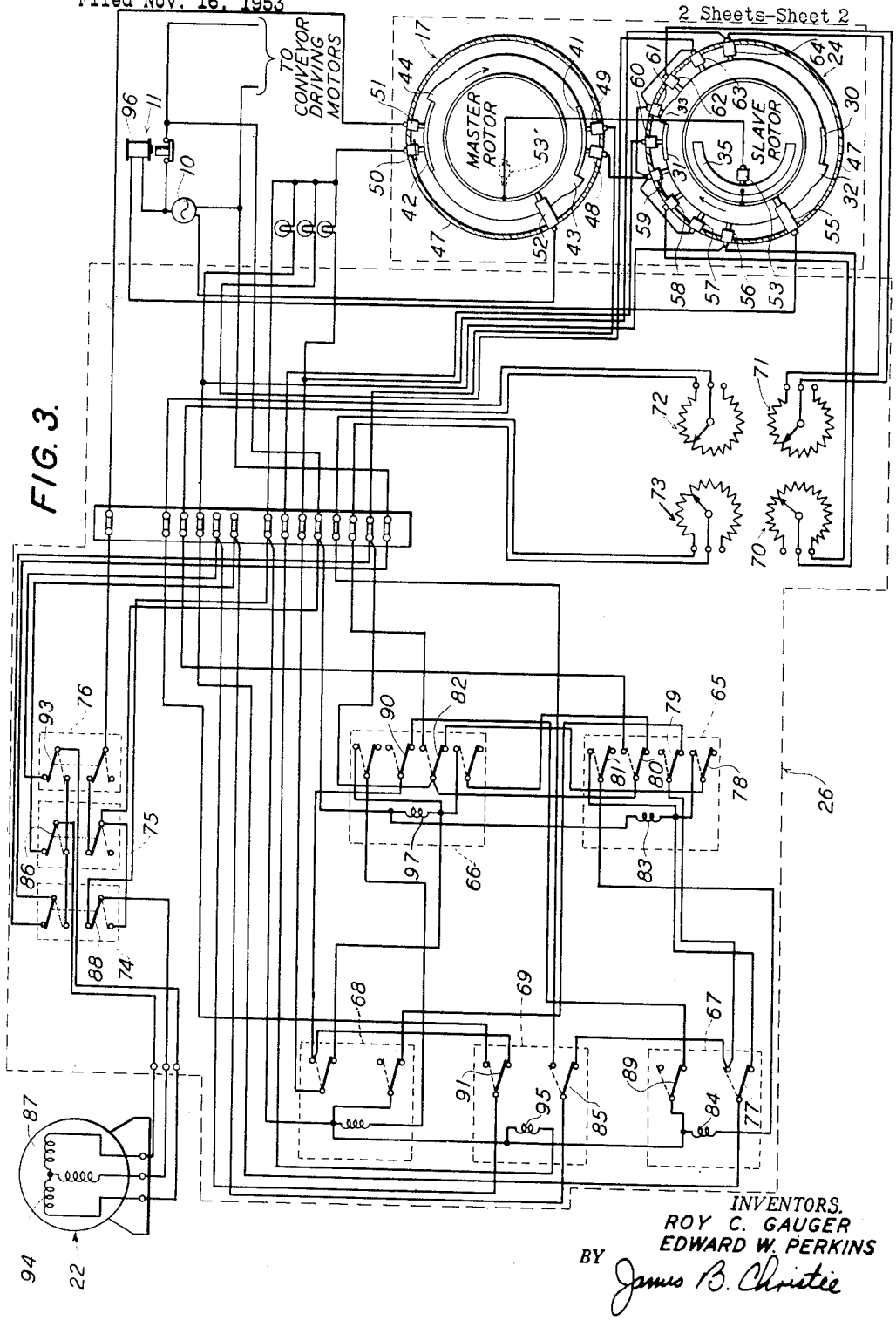

United States Patent Office 2,784,361
Patented Mar. 5, 1957

2,784,361

SPEED SYNCHRONIZER

Roy C. Gauger and Edward W. Perkins, Rochester, N. Y., assignors, by mesne assignments, to Consolidated Electrodynamics Corporation, Pasadena, Calif., a corporation of California Application November 16, 1953, Serial No. 392,396

14 Claims. (Cl. 318—75)

This invention relates to apparatus for synchronizing the speed of two movable members.

In many industrial operations it is often desirable and sometimes essential that the speed of two or more movable members be synchronized within rigidly fixed limits. For example, synchronization of the speed of conveyor belts is often required in plants using assembly-line manufacturing techniques.

Although the present invention is ideally suited for synchronizing the speed of two or more conveyor belts, it will be apparent that the apparatus described can be used to synchranize the movement of any members, regardless of character.

The present invention contemplates synchronization of two members, subsequently referred to as master and slave members, which are being moved by master and slave driving means, respectively. The speed at which the slave member is moved is controlled by a variable speed device which is adjusted by phase-sensitive means responsive to the movement of the master and slave members. The phase-sensitive means causes the variable speed device to be adjusted to increase the speed of the slave member when it tends to lag behind the master member and to decrease the speed of the slave member when it tends to move ahead of the master member.

In a preferred form of the invention, the phase-sensitive means comprises a first movable switch operative responsive to the movement of the master member and a second movable switch operative to the movement of the slave member. The switches cooperatively control electric power supplied to a speed control circuit which in turn operates an electrical motor adapted to adjust the variable speed device. An emergency automatic switching arrangement operative responsive to the phase-sensitive means shuts down the operation of the master and slave members when they have moved out of synchronization beyond a predetermined limit.

Preferably, the means for controlling the variable speed device is a reversible electric motor with a split field winding, hereinafter referred to as the speed control motor, and the movable switches are a pair of rotating switches which supply electrical power to the speed control circuit. Each rotating switch has a rotor with a plurality of conductive segments on its periphery. A conductive segment on each rotor serves as a reference index for its respective rotor, and the synchronizing apparatus synchronizes the speed of the slave member with that of the master member by maintaining alignment at the two reference indexes. The phase-sensitive means and the speed control circuit also provide the following desirable features:

1. The amount of power supplied to the speed control motor is dependent upon how much the slave member is lagging behind or running ahead of the master member.

2. The speed control motor for adjusting the variable speed control device is supplied with back E. M. F. braking after the phase-sensitive means and speed control circuit stop supplying electrical power to the motor.

3. Anticipating means are provided by the phase-sensitive means and speed control circuit to cause the speed control motor to adjust the variable speed device in a direction opposite to the prior adjustment when the reference indexes on the two rotating switches are approaching alignment.

4. Adjustable means are provided for controlling the amount of power supplied to the speed control motor when it is correcting and "anticipating" the movement of the slave member to synchronize it with the master member.

5. The speed control circuit is provided with manually operated switches for use whenever manual control is desired for the speed control motor.

6. The rotating switches of the phase-sensitive means are provided with means to prevent electrical shorting of adjacent conductive segments on the switch due to frictional wear occurring in the switches.

These and other aspects of the invention will be more clearly understood from the following detailed description taken in conjunction with the accompanying drawings in which:

Fig. 3 is a wiring diagram which illustrates how the rotating switches operate the speed control circuit to adjust the speed control motor.

Figure 1:
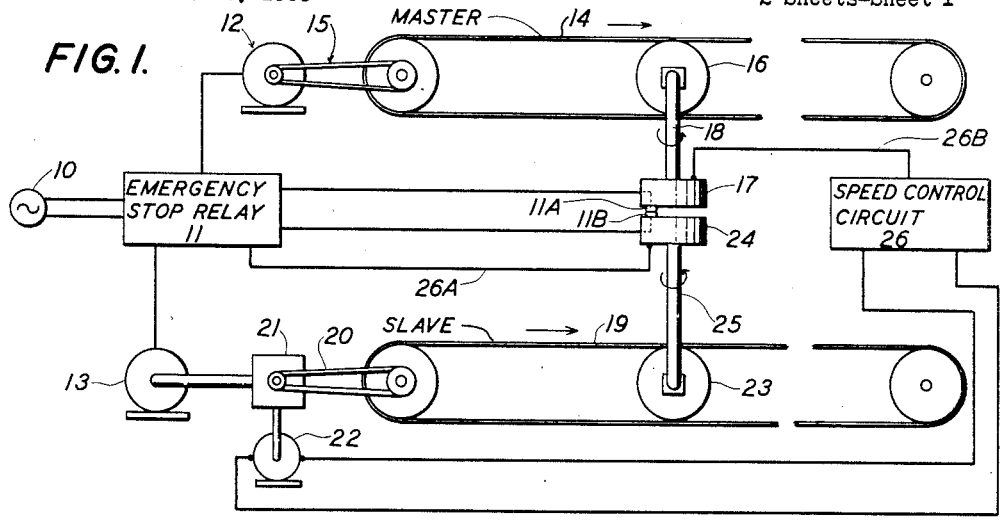
Fig. 1 illustrates schematically the use of the invention to synchronize the movement of two conveyor belts.

Referring to Fig. 1, a source of electric power 10 is fed through an emergency stop relay 11 from which power is taken to drive a first electric conveyor driving motor 12 and a second electric conveyor driving motor 13. A master conveyor belt 14 is powered by a pulley arrangement 15 from the first driving motor. An idler roller 16 rotated by the movement of the master conveyor belt is mechanically coupled to a master rotatable switch 17 by a master idling shaft 18. A slave conveyor belt 19 is powered by a pulley arrangement 20, from a conventional variable speed drive device 21, which is adjusted by a speed control motor 22. Power is supplied to the variable speed drive device from the second driving motor by conventional means. An idler roller 23 rotated by the movement of the slave conveyor belt is mechanically coupled to a slave rotatable switch 24 by a slave idling shaft 25.

The emergency stop relay is energized to supply power to the first and second electric driving motors, so long as the master and slave rotating switches are maintained within a predetermined limit of alignment, indicated schematically at 11A, 11B. Electric power is supplied to a speed control circuit 26 through the two rotating switches as long as the emergency stop relay is energized. Leads 26A, 26B indicate schematically the path of the power through the switch to the speed control circuit. The speed control circuit causes the speed control motor to turn in the proper direction to adjust the variable speed drive so the speed of the slave conveyor belt matches that of the master conveyor belt.

Figure 2:
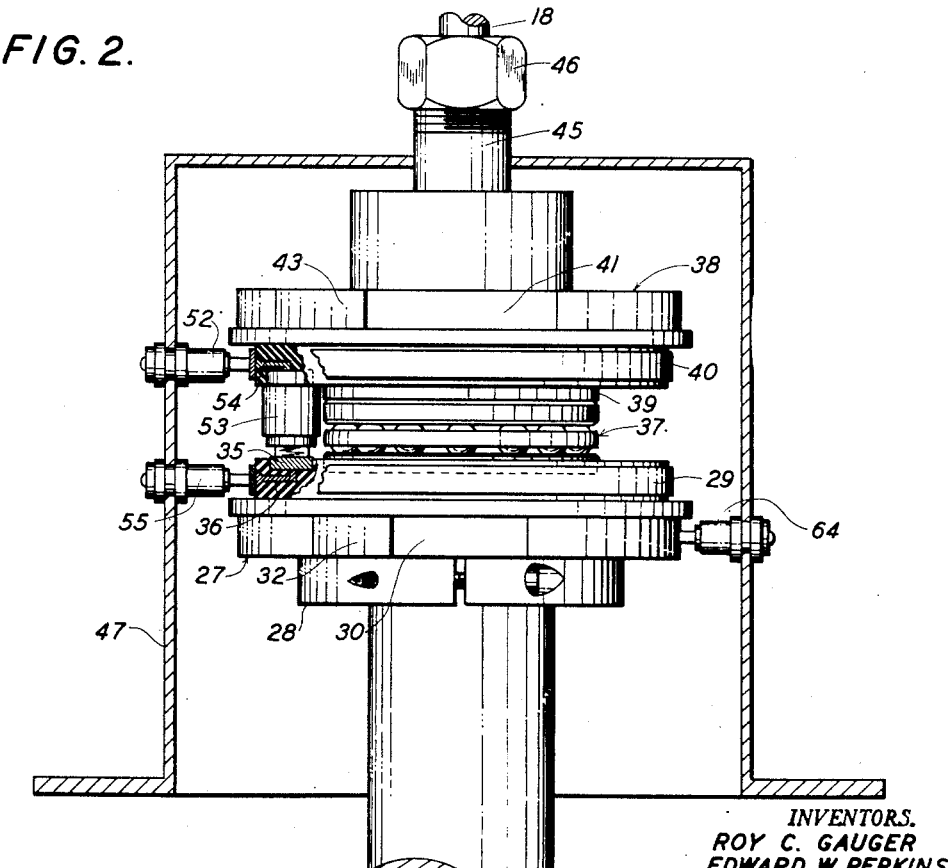
Fig. 2 is an elevation in partial section showing the details of the master and slave rotating switches which operate responsive to the master and slave conveyor belt, respectively.

Fig. 2 illustrates the disposition of the master and slave rotating switches with respect to each other. The slave rotating switch comprises a relatively short cylindrical slave rotor 27 made of a suitable insulating material such as Bakelite. The slave rotor is disposed with the axis of the cylinder substantially vertical, and the diameter of the upper portion is slightly less than that of the lower portion. The slave rotor is rigidly attached to the upper end of the slave idling shaft by means of a collar 28 attached to the lower surface of the rotor. The shaft extends colinearly with the axis of the rotor. An annular conductive ring 29 is disposed around the periphery of hte upper portion of the slave rotor. Two relatively short, arcuate conductive segments 30, 31 (see Fig. 3) of equal length are embedded on diametrically opposite portions of the lower part of the slave rotor periphery. The exposed surfaces of the segments project above the peripheral surface of the slave rotor. A ramp 32 is provided on the slave rotor periphery adjacent the leading edge of segment 30. The trailing edge of the ramp extends above the segment and the ramp tapers away from the segment in the direction of segment rotation to make a smooth junction with the slave rotor periphery. A similar ramp 33 is provided adjacent the leading edge of segment 31. A semi-circular conductive strip 35 is disposed on the upper face of the slave rotor near its periphery. An electrical lead 36 within the slave rotor connects the semi-circular conductor with the annular conductor. A thrust bearing 37 is embedded in the upper surface of the slave rotor.

The master switch has a master rotor 38 which is a cylinder of the same shape as the slave rotor. The master rotor is disposed with its axis of rotation colinear with that of the slave rotor and with the smaller diameter portion in the lower position. The lower surface of the master rotor is provided with a spacer 39 which rides on the upper side of the thrust bearing. An annular conductive ring 40 is disposed around the lower portion of the periphery of the rotor.

Two relatively short, arcuate conductive segments 41, 42 (see Fig. 3) of equal length are disposed on diametrically opposed portions of the upper portion of the master rotor periphery. Ramps 43, 44 are provided on the master rotor periphery adjacent the leading edges of segments 41, 42, respectively. The construction and disposition of these ramps are identical to that of the ramps provided on the slave rotor. The upper surface of the master rotor is attached to a shaft 45 extending colinearly with the axis of the master rotor. A locking nut 46 serves to couple this shaft to the master idling shaft. This locking nut may be loosened so that the master rotor can be adjusted independent of movement of the master conveyor belt.

A cylindrical housing 47 surrounds the two rotors and serves to support various brushes mounted around the rotors. The mounting of the brushes is shown diagrammatically in that portion of Fig. 3 which represents the master and slave rotors. A first pair of brushes 48, 49 are disposed through the housing wall adjacent the periphery of the master rotor containing the two relatively short conductive segments so they make successive, intermittent contact with the segments as the rotor revolves. These brushes are disposed in the same horizontal plane and are horizontally displaced from each other by a distance equal to approximately one-half the length of one of the conductive segments. Diametrically opposed to the first pair of brushes is a second pair of brushes 50, 51 located through the housing wall in the same horizontal plane as the first pair of brushes and also adapted to make successive intermittent contact with the two segments as the rotor revolves. Ordinarily, the spacing between the second pair of brushes is equal to the spacing between the first pair; however, one of the brushes, brush 50 for example, may be moved in a horizontal direction to control the length of time which conductive segments 41, 42 maintain contact between brushes 50, 51.

A first monitoring brush 52 is disposed through the housing wall so as to make continuous electrical contact with the annular ring on the lower portion of the master rotor. A second monitoring brush 53 is embedded in the lower face of the master rotor and extends at right angles thereto so that it contacts the semi-circular conductive segment disposed in the upper face of the slave rotor. An electrical lead 54 in the master rotor connects the annular ring on the master rotor with the second monitoring brush. A third monitoring brush 55 is disposed through the wall of the housing to make continuous electrical contact with the annular conductive ring disposed around the upper portion of the slave rotor.

A series of nine sampling brushes 56, 57, 58, 59, 60, 61, 62, 63, 64 are disposed through the housing wall to make successive intermittent electrical contact with the two conductive segments disposed on the lower portion of the slave rotor periphery as the slave rotor is rotated. The sampling brushes are spaced in the same horizontal plane as the segments by a distance slightly less than the length of one of the segments on the slave rotor.

The brushes adapted to make successive intermittent electrical contact with the respective conductive segments on the master and slave rotors are spring-loaded and arranged so that their only sliding contact is with a trailing portion of the inclined ramp disposed adjacent the leading edge of each of the conductive segments and with the segments. With this arrangement the brushes are not subjected to frictional wear for a large portion of the time in which the rotary switches are in operation. This reduces the wear on the brushes and prevents spreading of conductive material from the brushes around the periphery of the rotor; and thereby prevents shorting of the conductive segments.

The speed control circuit and its relation with the rotary switches and speed control motor are shown diagrammatically in Fig. 3. The circuit has a locking relay 65 operative for decreasing the speed of the slave rotor, a locking relay 66 operative for increasing the speed of the slave rotor, a correcting relay 67 operative to increase the speed of the slave rotor, a correcting relay 68 operative to decrease the speed of the slave rotor, a compensating relay 69 operative to anticipate when an overcorrection has been supplied to the slave rotor, a pair of rheostats 70, 71 for controlling the amount of correction supplied to the rotor to increase or decrease its speed, respectively, a pair of rheostats 72, 73 to control the amount of power supplied to compensate the slave rotor when it has been overcorrected to run too fast or too slow, respectively, an emergency stop relay 11 to disconnect all power supplied to the conveyor system when the slave and master rotor move out of synchronization beyond a predetermined limit, and three manually operated switches 74, 75, 76 which may be used to override the signals furnished by the rotating switches to provide manual control of the variable speed control device when desired. These elements are interconnected and connected to the speed control motor and the various brushes associated with the rotating switches as shown in Fig. 3. All of the arms of the various relays and switches are spring-loaded in the positions indicated by the solid lines. The dotted lines indicate the positions of the arms when the relays or switches are energized.

The operation of the system is most easily understood by considering a specific example. The conductive segments on the master rotor serve to establish simultaneous electrical contact between the respective pairs of brushes successively and intermittently as the master rotor revolves. This provides intermittent electric power to sample brushes 57, 59, 61, 63 disposed around the periphery of the slave rotor. As long as the master and slave rotors are aligned as shown in Fig. 3, an open circuit will exist between the sample brushes supplied intermittent electric power and the adjacent sampling brushes.

If the slave conveyor belt slows down with respect to the master conveyor belt, thereby causing conductive segment 31 of the slave rotor to establish electrical contact between sampling brushes 58, 59 when the conductive segments of the master rotor are in the position shown in Fig. 3, the circuit will operate as follows: Electric current is supplied through rheostat 70 and arm 77 of relay 67 to energize the locking relay 65. This causes the relay arms 78, 79, 80, 81 of relay 65 to assume the dotted-line positions, as shown in Fig. 3. This allows power to be taken from an arm 82 of locking relay 66 and be applied to energize coil 83 of relay 65 and lock it in an energized position which is maintained until such time that the slave rotor may move so far ahead of the master rotor that it initiates a correction in the opposite direction. In this respect, relay 65 serves as a "memory" device for remembering in which direction the slave rotor was last corrected.

With relay 65 locked in the energized position, power is supplied to energize the coil 84 of relay 67 through arm 81 of relay 65 so the arms of relay 67 assume the dotted-line position. This allows the electrical signal from the slave rotor to pass through arm 77 of relay 67, through arm 85 of the compensating relay, through arm 86 of manually operable switch 75 to a coil winding 87 of the speed control motor, which causes the speed control motor to turn in such a direction that it adjusts the variable speed control device to cause the conveyor belt to increase in speed. Relay 67 is held in the energized position until such time that brushes 50, 51 are no longer connected electrically.

After the circuit between sampling brushes 58, 59 is broken, electric power is no longer supplied to the speed control motor. However, the motor has a certain amount of momentum which ordinarily would require an inherent amount of "run-down" time for it to come to a complete stop. This is an undesirable feature, because it doesn't permit precise control of the variable speed device. To avoid this difficulty, the circuit is arranged to make use of the back E. M. F. generated by the speed control motor to stop the motor quickly. After power is no longer supplied from the slave rotor, the back E. M. F. from the coil of the speed control motor is fed through arm 88 of the manually operable switch 74, through an arm 89 of relay 67, through an arm 90 of relay 66, through an arm 91 of relay 69, through an arm 93 of the manually operable switch 76 to a coil 94 of the speed control motor. This causes the speed control motor to stop almost instantly.

As long as the slave rotor tends to "lag behind" the master rotor, electrical power will be supplied from the slave rotor to the speed control motor to increase the speed of the slave conveyor belt in the manner just described. If the slave rotor lags so far behind the master rotor that electrical contact is established between sample brushes 56, 57 variable rheostat 70 is by-passed so a large corection is applied to the variable speed control device.

As the slave rotor begins to "catch up" with the master rotor, it is apparent that it has been overcorrected and that if the condition is allowed to remain static, the slave rotor would soon move ahead of the master rotor. This, of course, would result in undesirable "hunting" of the apparatus. To avoid "hunting," an anticipating feature is provided in the circuit to compensate for overcorrection. Its operation is as follows: If conductive segment 31 moves to the position to establish electrical contact between brushes 59, 60 when the master rotor is in the position shown in Fig. 3, electric power is supplied from the slave rotor to energize coil 95 of relay 69 and causes the relay arms of relay 69 to assume the dotted-line position. This allows electric power to be supplied from arm 80 of relay 65 through rheostat 72, through arm 91 of compensating relay 69 to coil 94 of the speed control motor, which causes the variable control device to be adjusted in a direction to decrease the speed of the slave rotor. The amount of "compensating" power supplied to the speed control motor may be controlled by the rheostat 72, and through experience gained in the operation of the invention the rheostat can be set to greatly reduce "hunting."

The power to drive the conveyor motors and the speed control motor is available only as long as the emergency stop relay is energized. If the slave rotor should move so far out of synchronization with the master rotor that monitoring brush 53 no longer makes electrical contact with semi-circular conductor 35 on the slave rotor, then the coil circuit 96 of the emergency stop relay is broken and relay 11 is thrown open so that no power is supplied to the conveyor motors or to the speed control motor.

In case the emergency stop relay circuit is opened, the cause of the de-synchronization of the conveyor belts must be determined and the master and slave rotors realigned by using locking nut 46 before the apparatus can be put into operation again.

In the event that adjustment of the variable speed device is desired at a rate faster than can be supplied by the automatic correcting means, the manual switches can be operated to adjust the variable speed control device as follows: If the speed control motor is to be turned for a considerable amount in the direction to increase the speed of the slave rotor, manually operated switches 74, 75 are pushed to the dotted-line position to supply power directly to the speed control motor. In the event the motor is to be adjusted in the opposite direction, switches 74, 76 are pushed to the dotted-line position.

The above example illustrates the operation of the invention when considering the effect of the relative positions of the segments 31, 42 on the slave and master rotors, respectively. An identical result occurs from the cooperative functioning of segments 30 and 41 on the slave and master rotors, respectively. The advantage in having a pair of symmetrically disposed segments on each rotor is that the frequency of sampling, and hence correction, is doubled.

The operation of the apparatus to correct, compensate, and provide back E. M. F. braking to the speed control motor when the slave rotor is tending to run ahead of the master rotor, is achieved by the remainder of the circuit which is symmetrical with the position of the above described circuit.

For example, if the segment 31 on the slave rotor moves to the position to establish contact between brushes 61, 62 when segment 42 is in the position shown in Fig. 3, electrical power is applied through rheostat 71, through relay 68, to the energizing coil 97 of the locking relay 66. This causes the arms of locking relay 66 to assume the dotted-line position and interrupt the supply of power to the energizing coil 83 of locking relay 65, assuming relay 65 to have been locked in the energized position due to the above described correction. This allows the arms of relay 65 to return to the solid-line positions. Locking relay 66 is then locked in an energizing position by power supplied from relay 65. With the circuit in this condition power is applied to the speed control motor to adjust the variable speed control device to decrease the speed of the slave rotor. Additional correcting, back E. M. F. braking, and compensating as required is supplied by the circuit to the speed control motor to adjust the variable speed control device to cause segment 31 on the slave rotor to become realigned with segment 42 on the master rotor. Since this result is achieved by means symmertical with the above described means operative to align segments 31, 42 when the slave rotor lags behind the master rotor, a detailed description of the operation is omitted.

We claim:

1. In a system for synchronizing the movement of a slave member being moved by a first driving means with the movement of a master member being moved by a second driving means the combination comprising a variable speed device for controlling the rate at which the slave member is being moved by the first driving means, electrical phase-sensitive means operative responsive to the relative movement of the slave and master members for adjusting the variable speed device to increase the speed of the slave member when it tends to lag behind the master member and to decrease the speed of the slave member when it tends to move ahead, and an automatic emergency switching arrangement operative responsive to the phase-sensitive means for stopping the slave and master members when they become out of phase by a pre-determined amount.

2. In a system for synchronizing the movement of a slave member being moved by a first driving means with the movement of a master member being moved by a second driving means the combination comprising a variable speed device for controlling the rate at which the slave member is being moved by the first driving means, electrical phase-sensitive means operative responsive to the relative movement of the slave and master members for automatically adjusting the variable speed device to increase the speed of the slave member when it tends to lag behind the master member and to decrease the speed of the slave member when it tends to move ahead, an automatic emergency switching arrangement operative responsive to the phase-sensitive means for stopping the slave and master mebers when they become out of phase by a predetermined amount, and a manually controlled switching arrangement for overriding the phase-sensitive means so the variable speed device is controlled manually.

3. In a system for synchronizing the movement of a slave member being driven by a first driving means with the movement of a master member being driven by a second driving means the combination comprising a variable speed device for controlling the speed at which the first driving means drives the slave member, means adapted to adjust the variable speed device, a first electric switch operative responsive to the movement of the slave member, a second electric switch operative responsive to the movement of the master member, and a plurality of electrical contacts disposed around the switches and adapted to supply electric power to the means for adjusting the variable speed device so that the variable speed drive is adjusted to increase the rate at which the slave member is driven when the slave member tends to lag behind the master member and to decrease the rate at which the slave member is driven when the slave member tends to move ahead of the master member.

4. In a system for synchronizing the movement of a slave member being driven by a first driving means with the movement of a master member being driven by a second driving means the combination comprising a variable speed device for controlling the speed at which the first driving means drives the slave member, means adapted to adjust the variable speed device, a first rotatable electric switch operative responsive to the movement of the slave member, a second rotatable electric switch operative responsive to the movement of the master member, and a plurality of electrical contacts disposed around the switches and adapted to supply electric power to the means for adjusting the variable speed device so that the variable speed drive is adjusted to increase the rate at which the slave member is driven when the slave member tends to lag behind the master member and to decrease the rate at which the slave member is driven when the slave member tends to move ahead of the master member.

5. In a system for synchronizing the movement of a slave member being driven by a first driving means with the movement of a master member being driven by a second driving means the combination comprising a variable speed device for controlling the speed at which the first driving means drives the slave member, an electric motor adapted to adjust the variable speed device, a first rotatable electric switch which rotates responsive to the movement of the slave member, a second rotatable electric switch which rotates responsive to the movement of the master member, and is connected serially with the first switch, a plurality of electrical contacts disposed around the switches, a speed control circuit adapted to receive electric power from the rotating switches and supply electric power to the electric motor so that the motor adjusts the variable speed drive to increase the rate at which the slave member is driven when the slave member tends to lag behind the master member and to decrease the rate at which the slave member is driven when the slave member tends to move ahead of the master member.

6. In a system for synchronizing the movement of a slave member being driven by a first driving means with the movement of a master member being driven by a second driving means the combination comprising a variable speed device for controlling the speed at which the first driving means drives the slave member, a reversible electric motor adapted to adjust the variable speed device, a first rotatable electric switch which rotates responsive to the movement of the slave member, a second rotatable electric switch which rotates responsive to the movement of the master member, and is connected serially with the first switch, a plurality of electrical contacts disposed around the switches, a speed control circuit adapted to receive electric power from the rotating switches and supply electric power to the electric motor so that the motor adjusts the variable speed drive to increase the rate at which the slave member is driven when the slave member tends to lag behind the master member and to decrease the rate at which the slave member is driven when the slave member tends to move ahead of the master member.

7. In a system for synchronizing the movement of a slave member being driven by a first driving means with the movement of a master member being driven by a second driving means the combination comprising a variable speed device for controlling the speed at which the first driving means drives the slave member, an electric motor adapted to adjust the variable speed device, a first rotatable electric switch which rotates responsive to the movement of the slave member, a second rotatable electric switch which rotates responsive to the movement of the master member and is connected serially with the first switch, a plurality of electrical contacts disposed around the switches, a speed control circuit adapted to receive electric power from the rotating switches and to supply electric power to the electric motor so that the motor adjusts the variable speed drive to increase the rate at which the slave member is driven when the slave member tends to lag behind the master member and to decrease the rate at which the slave member is driven when the slave member tends to move ahead of the master member, and means in the speed control circuit to supply back E. M. F. braking to the electric motor.

8. In a system for synchronizing the movement of a slave member being driven by a first driving means with the movement of a master member being driven by a second driving means the combination comprising a variable speed device for controlling the speed at which the first driving means drives the slave member, an electric motor adapted to adjust the variable speed device, a first rotatable electric switch which rotates responsive to the movement of the slave member, a second rotatable electric switch which rotates responsive to the movement of the master member, a plurality of electrical contacts disposed around the switches, a speed control circuit adapted to receive electric power from the rotating switches and to supply electric power to the electric motor so that the motor adjusts the variable speed drive to increase the rate at which the slave member is driven when the slave member tends to lag behind the master member and to decrease the rate which the slave member is driven when the slave member tends to move ahead of the master member, and adjustable means in the speed control circuit for controlling the amount of power supplied to the electric motor.

9. In a system for synchronizing the movement of a slave member being driven by a first driving means with the movement of a master member being driven by a second driving means the combination comprising a variable speed device for controlling the speed at which the first driving means drives the slave member, an electric motor adapted to adjust the variable speed device, a first rotatable electric switch which rotates responsive to the movement of the slave member, a second rotatable electric switch which rotates responsive to the movement of the master member, and a plurality of electrical contacts disposed around the switches and adapted to supply electric power to the electric motor so that the motor adjusts the variable speed drive to increase the rate at which the slave member is driven when the slave member tends to lag behind the master member and to decrease the rate at which the slave member is driven when the slave member tends to move ahead of the master member, the electrical contacts being so constructed and arranged that the amount of power supplied to the electric motor increases as the amount increases by which the slave and master members are out of phase.

10. In a system for synchronizing the movement of a slave member being driven by a first driving means with the movement of a master member being driven by a second driving means the combination comprising a variable speed device for controlling the speed at which the first driving means drives the slave member, an electric motor adapted to adjust the variable speed device, a first rotatable electric switch which rotates responsive to the movement of the slave member, a second rotatable electric switch which rotates responsive to the movement of the master member, a plurality of electrical contacts disposed around the switches, a speed control circuit adapted to receive electric power from the rotating switches and to supply electric power to the electric motor so that the motor adjusts the variable speed drive to increase the rate at which the slave member is driven when the slave member tends to lag behind the master member and to decrease the rate at which the slave member is driven when the slave member tends to move ahead of the master member, and anticipation means provided by the switches and speed control circuit for causing the electric motor to adjust the variable speed device in the opposite direction from the previous adjustment as the slave and master members approach synchronization.

11. Apparatus according to claim 10 in which the anticipating means is provided with adjustable means for controlling the amount of power supplied to the electric motor.

12. In an electrical switching arrangement adapted to give electrical signals indicative of the synchronization of a slave member with a master member, the combination comprising a first rotor rotatable responsive to the movement of the master member, at least one conductive segment mounted on the periphery of the first rotor, a first pair of brushes disposed adjacent the periphery of the first rotor, a second pair of brushes disposed adjacent the periphery of the rotor, the brushes and each segment on the first rotor being arranged so that as the first rotor rotates each of the segments successively and simultaneously electrically connects the first pair of brushes and electrically connects the second pair of brushes, respectively, a second rotor rotatable responsive to the slave member, conductive segments mounted on the periphery of the second rotor matching the conductive segments on the first rotor, a plurality of sampling brushes disposed adjacent the periphery of the second rotor with alternate sampling brushes electrically connected to one of the brushes adjacent the first rotor, the sampling brushes being spaced so that each conductive segment on the second rotor makes successive electrical contact between the commonly connected brushes and an adjacent brush.

13. In an electrical switching arrangement adapted to give electrical signals indicative of the synchronization of a slave member with a master member, the combination comprising a first rotor rotatable responsive to the movement of the master member, a first conductive segment mounted on the periphery of the first rotor, a second conductive segment mounted on the periphery of the first rotor diametrically opposed to the first segment, a first pair of brushes disposed adjacent the periphery of the first rotor, a second pair of brushes disposed adjacent the periphery of the rotor, the brushes and segments being arranged so that as the first rotor rotates each of the segments successively and simultaneously makes electrical contact between the first and second pair of brushes, respectively, a second rotor rotatable responsive to the slave member, a first conductive segment mounted on the periphery of the second rotor, a second conductive segment mounted on the periphery of the second rotor diametrically opposed to the first segment, a plurality of sampling brushes disposed adjacent the periphery of the second rotor with alternate sampling brushes electrically connected to one of the brushes adjacent the first rotor, the sampling brushes being spaced so that each conductive segment on the second rotor makes successive electrical contact between the commonly connected brushes and an adjacent brush.

14. Apparatus according to claim 13 in which a first annular conductive strip is disposed around the periphery of the first rotor clear of the two conductive segments on the first rotor, a first monitoring brush is disposed adjacent the first rotor and adapted to make continuous electrical contact with the first annular conductive strip, a second monitoring brush attached to the periphery of the first rotor and adapted to rotate with it clear of the other brushes disposed around the first rotor, the second monitoring brush being electrically connected to the first annular conductive strip, a second annular conductive strip disposed around the periphery of the second rotor clear of the other conductive segments on the second rotor, a third monitoring brush disposed adjacent the second rotor and adapted to make continuous electrical contact with the second annular conductive strip, and a conductive monitoring strip disposed around a portion of the periphery of the second rotor and adapted to have the second monitoring brush ride on it, the conductive monitoring strip being electrically connected to the second annular conductive strip.

References Cited in the file of this patent

UNITED STATES PATENTS

| | | |
|---|---|---|
| 1,662,677 | Jenkins | Mar. 13, 1928 |
| 1,818,963 | Tolson | Aug. 11, 1931 |
| 2,333,659 | Mayer | Nov. 9, 1943 |
| 2,371,023 | Blow | Mar. 6, 1945 |
| 2,462,033 | Yardeny | Feb. 15, 1949 |
| 2,484,006 | Ankenman et al. | Oct. 11, 1949 |
| 2,543,077 | Treseder | Feb. 27, 1951 |